(12) United States Patent
Matsumoto

(10) Patent No.: US 10,522,871 B2
(45) Date of Patent: Dec. 31, 2019

(54) SECONDARY BATTERY AND CURRENT COLLECTOR TERMINAL

(71) Applicant: TOYOTA JIDOSHA KABUSHIKI KAISHA, Toyota-shi, Aichi-ken (JP)

(72) Inventor: Mizuho Matsumoto, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 87 days.

(21) Appl. No.: 15/955,839

(22) Filed: Apr. 18, 2018

(65) Prior Publication Data

US 2018/0316050 A1   Nov. 1, 2018

(30) Foreign Application Priority Data

Apr. 28, 2017   (JP) ................. 2017-090317

(51) Int. Cl.
| | |
|---|---|
| *H01M 10/0525* | (2010.01) |
| *H01M 2/30* | (2006.01) |
| *H01M 4/66* | (2006.01) |
| *H01M 4/70* | (2006.01) |
| *H01M 2/14* | (2006.01) |
| *H01M 4/02* | (2006.01) |

(52) U.S. Cl.
CPC ......... *H01M 10/0525* (2013.01); *H01M 2/14* (2013.01); *H01M 2/30* (2013.01); *H01M 4/661* (2013.01); *H01M 4/70* (2013.01); *H01M 2004/027* (2013.01); *H01M 2004/028* (2013.01)

(58) Field of Classification Search
CPC ...... H01M 10/0525; H01M 2/14; H01M 2/30; H01M 4/70; H01M 4/661; H01M 2/26
See application file for complete search history.

(56) References Cited

U.S. PATENT DOCUMENTS

| | | | |
|---|---|---|---|
| 9,537,134 B2 * | 1/2017 | Lee | H01M 2/22 |
| 2017/0054136 A1 * | 2/2017 | Byun | H01M 2/263 |
| 2018/0131030 A1 * | 5/2018 | Matsuura | H01M 2/06 |

FOREIGN PATENT DOCUMENTS

| | | |
|---|---|---|
| JP | 10-261441 A | 9/1998 |
| JP | 2007-299536 A | 11/2007 |
| JP | 2014-182880 A | 9/2014 |

\* cited by examiner

*Primary Examiner* — Stewart A Fraser
(74) *Attorney, Agent, or Firm* — Sughrue Mion, PLLC

(57) ABSTRACT

A secondary battery includes a stacked electrode assembly in which a plurality of positive electrode sheets and a plurality of negative electrode sheets are stacked. Current collector terminals include current collector plate portions each extending along a plane orthogonal to exposed portions of the positive electrode sheets and exposed portions of the negative electrode sheets. Each of base plate portions is continuous with the current collector plate portion and extends along one side of the electrode assembly that is orthogonal to one side thereof from which the exposed portions protrude. Each of the current collector plate portions includes a plurality of slits extending from a tip end of the current collector plate portion along a direction orthogonal to the base plate portion, and extending into a curved portion. The exposed portions are inserted in the slits of the current collector terminals.

8 Claims, 4 Drawing Sheets

SECONDARY BATTERY AND CURRENT COLLECTOR TERMINAL

CROSS REFERENCE TO RELATED APPLICATIONS

The present application claims priority from Japanese Patent Application No. 2017-090317 filed on Apr. 28, 2017, which is incorporated by reference herein in its entirety.

BACKGROUND

The present invention relates to secondary batteries and current collector terminals.

JP 2014-182880 A discloses a secondary battery that includes what is called a stacked electrode assembly. In the stacked electrode assembly, a plurality of positive electrode plates and a plurality of negative electrode plates are alternately stacked with separators interposed therebetween. The positive electrode sheets and the negative electrode sheets are not spirally wound. In the secondary battery disclosed in the publication, each of the positive electrode and the negative electrode includes a plurality of metal foil parts that are called tabs. The plurality of tabs are attached to a positive electrode terminal or a negative electrode terminal.

SUMMARY

Each of the positive electrode sheets includes a positive electrode active material layer containing a positive electrode active material. Each of the negative electrode sheets includes a negative electrode active material layer containing a negative electrode active material. When a battery case has a larger area in which the positive electrode active material layer and the negative electrode active material layer face each other, the battery case has a greater region that contributes to the battery reaction. When this is taken into consideration, it will be appreciated that a current collector terminal that occupies less space in the battery case ensures a larger effective area within the battery case. The present application is particularly intended for what is called a stacked electrode assembly, in which the positive electrode sheets and the negative electrode sheets are alternately stacked with separators interposed therebetween and they are not in a wound configuration. For a secondary battery equipped with the stacked electrode assembly, the present application proposes a novel structure of a current collector terminal and a novel structure of a secondary battery that uses such a current collector terminal, which can improve the capacity or the energy density.

A secondary battery proposed herein includes a plurality of positive electrode sheets, a plurality of negative electrode sheets, a positive electrode current collector terminal, and a negative electrode current collector terminal. Each of the positive electrode sheets includes a rectangular-shaped positive electrode current collector foil and a positive electrode active material layer, provided on the positive electrode current collector foil except for an exposed portion defined along one side of the rectangular-shaped positive electrode current collector foil. Each of the negative electrode sheets includes a rectangular-shaped negative electrode current collector foil, and a negative electrode active material layer, provided on the negative electrode current collector foil except for an exposed portion defined along one side of the rectangular-shaped negative electrode current collector foil. The positive electrode active material layers and the negative electrode active material layers are alternately stacked in a thickness direction with separators interposed therebetween. The exposed portions of the plurality of positive electrode sheets protrude from one lateral side of the separators, and the exposed portions of the plurality of negative electrode sheets protrude from another side of the separators that is opposite the exposed portions of the plurality of positive electrode sheets.

The positive electrode current collector terminal includes a first current collector plate portion extending along a plane orthogonal to the exposed portions of the plurality of positive electrode sheets, a first base plate portion being curvedly continuous with the first current collector plate portion and extending along one side of the plurality of positive electrode sheets that is orthogonal to another side thereof provided with the exposed portions, and a plurality of slits, extending from a tip end of the first current collector plate portion along a direction orthogonal to the first base plate portion and extending into a curved portion provided between the first base plate portion and the first current collector plate portion. The negative electrode current collector terminal includes a second current collector plate portion extending along a direction orthogonal to the exposed portions of the plurality of negative electrode sheets, a second base plate portion being curvedly continuous with the second current collector plate portion and extending along one side of the plurality of positive electrode sheets that is orthogonal to another side thereof provided with the exposed portions, and a plurality of slits, extending from a tip end of the second current collector plate portion along a direction orthogonal to the second base plate portion and extending into a curved portion provided between the second base plate portion and the second current collector plate portion. The exposed portions of the plurality of positive electrode sheets are inserted in the slits of the positive electrode current collector terminal. The exposed portions of the plurality of negative electrode sheets are inserted in the slits of the negative electrode current collector terminal.

Such an embodiment of the secondary battery makes it possible to reduce the space required for the positive electrode current collector terminal and the negative electrode current collector terminal. It is possible to ensure a large area for the portion in which the positive electrode active material layers and the negative electrode active material layers are alternately stacked in a thickness direction with separators interposed therebetween. As a result, it is possible to increase the battery capacity. In other words, it is possible to provide a secondary battery with a higher capacity.

In an embodiment of such a secondary battery, the plurality of slits in the first current collector plate portion may extend into the first base plate portion. The plurality of slits in the second current collector plate portion may extend into the second base plate portion. In a tip end portion of the first current collector plate portion, each of the plurality of slits in the first current collector plate portion may have a width widening toward the tip end of the first current collector plate portion. In a tip end portion of the second current collector plate portion, each of the plurality of slits in the second current collector plate portion may have a width widening toward the tip end of the second current collector plate portion. Each of the first current collector plate portion and the second current collector plate portion may be in a flat plate shape.

A current collector terminal proposed herein includes a base plate portion, a current collector plate portion being curvedly continuous with the base plate portion and extending along a direction orthogonal to the base plate portion, and a plurality of slits, extending from a tip end of the current collector plate portion along a direction orthogonal to the base plate portion, and extending into a curved portion provided between the base plate portion and the current collector plate portion.

It is possible that each of the plurality of slits may extend into the base plate portion. It is also possible that, in a tip end portion of the current collector plate portion, each of the plurality of slits may have a width widening toward the tip end of the current collector plate portion. It is also possible that the current collector plate portion may be in a flat plate shape.

DETAILED DESCRIPTION OF THE PREFERRED EMBODIMENTS

Hereinbelow, embodiments of a secondary battery and a current collector terminal proposed herein will be described. It should be noted that the embodiments described herein are, of course, not intended to limit the present invention. The present invention is not limited to the embodiments described herein unless specifically stated otherwise.

Figure 1:
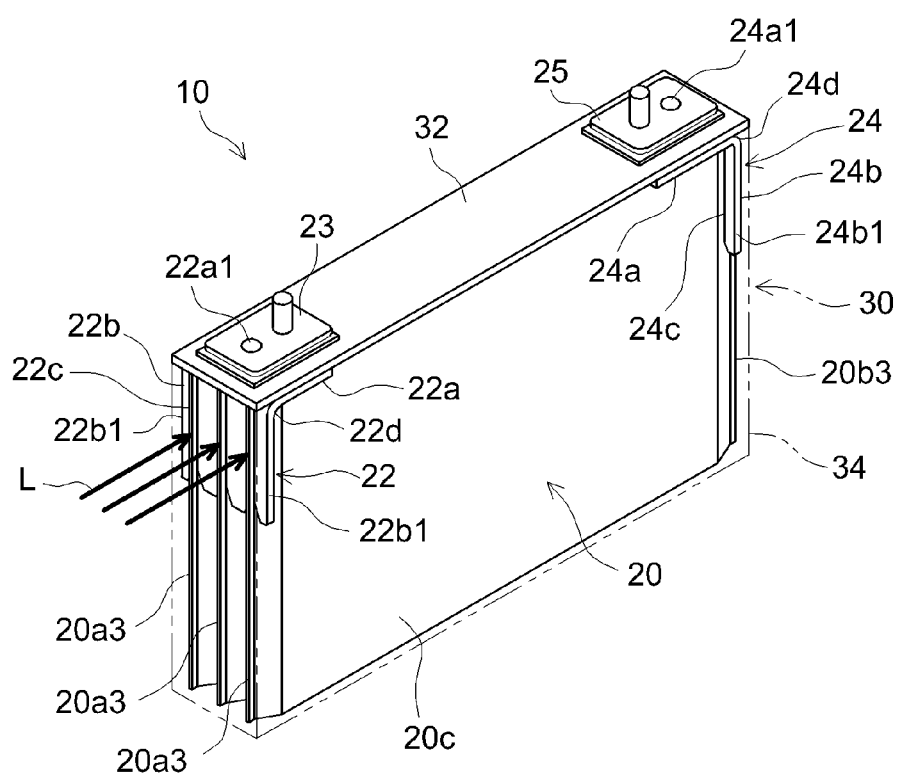
FIG. 1 is a perspective view illustrating an electrode assembly 20 of a secondary battery 10 proposed herein.
Figure 2:
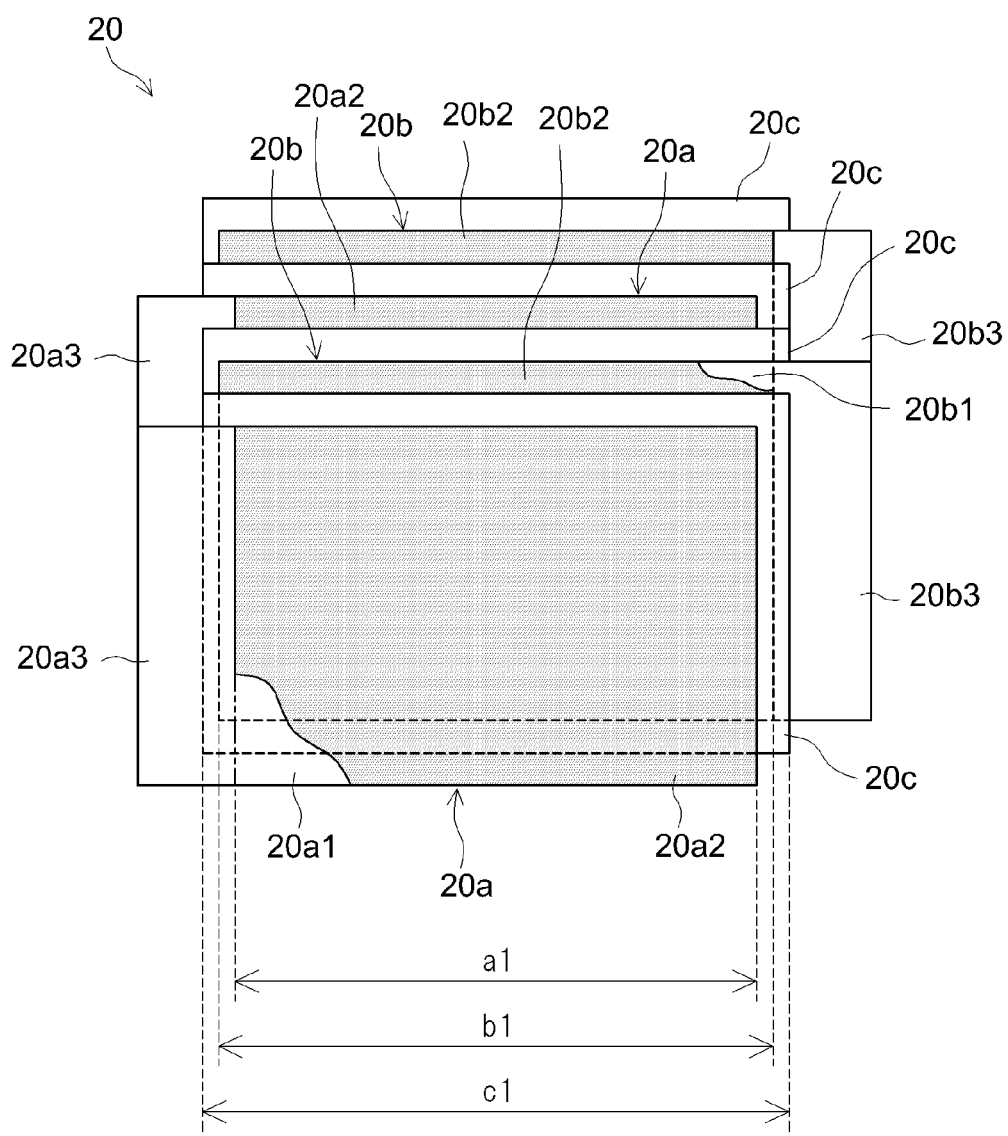
FIG. 2 is an exploded view illustrating the structure of the electrode assembly.

FIG. 1 is a perspective view illustrating an electrode assembly 20 of a secondary battery 10 proposed herein. FIG. 2 is an exploded view illustrating the structure of the electrode assembly 20. In the embodiment shown in FIG. 1, the electrode assembly 20 is fitted with a positive electrode current collector terminal 22 and a negative electrode current collector terminal 24. The electrode assembly 20 is fitted to a lid 32 of a battery case 30 via the positive electrode current collector terminal 22 and the negative electrode current collector terminal 24. In FIG. 1, a case main body 34 of the battery case 30 is indicated by the dash-dot-dot lines as virtual lines. The battery case 30 is what is called a prismatic case, and the case main body 34 has a closed-bottom rectangular parallelepiped shape one side face of which is open. The electrode assembly 20 attached to the lid 32 is enclosed in the case main body 34 together with electrolyte and so forth. The electrolyte may be, for example, an electrolyte solution in which a lithium salt is dissolved in an organic solvent. An example of the electrolyte solution includes a non-aqueous electrolyte solution in which an electrolyte such as $LiPF_6$ is contained in a mixed solvent of non-aqueous solvents such as ethylene carbonate (EC), dimethyl carbonate (DMC), and ethyl methyl carbonate (EMC).

As illustrated in FIG. 2, in the electrode assembly 20, a plurality of positive electrode sheets 20a and a plurality of negative electrode sheets 20b are stacked alternately with separators 20c interposed therebetween. The electrode assembly 20 is not a wound electrode assembly but what is called a stacked electrode assembly. Each of the separators 20c is formed of, for example, an electrolyte permeable porous resin sheet that possesses required heat resistance. In FIG. 2, the positive electrode sheets 20a, the negative electrode sheet 20b, and the separators 20c are shown in a staggered condition. In FIG. 2, two positive electrode sheets 20a and two negative electrode sheets 20b are stacked alternately with separators 20c interposed therebetween. In the electrode assembly 20, a larger number of positive electrode sheets 20a and a larger number of negative electrode sheets 20b are stacked alternately with separators 20c interposed therebetween.

The positive electrode sheet 20a includes a positive electrode current collector foil 20a1 and a positive electrode active material layer 20a2. The positive electrode current collector foil 20a1 is a rectangular-shaped sheet. An exposed portion 20a3 is defined along one side of the rectangular-shaped positive electrode current collector foil 20a1. The positive electrode active material layer 20a2 is provided on the positive electrode current collector foil 20a1 except for the exposed portion 20a3. In this embodiment, the positive electrode current collector foil 20a1 is an aluminum foil. The positive electrode active material layer 20a2 contains a positive electrode active material. In a lithium-ion secondary battery, the positive electrode active material is a material that releases lithium ions during charge and absorbs lithium ions during discharge, such as lithium-transition metal composite material. Other than the lithium-transition metal composite material, various materials have been proposed for use as the positive electrode active material, and the positive electrode active material is not limited to a particular material.

The negative electrode sheet 20b includes a negative electrode current collector foil 20b1 and a negative electrode active material layer 20b2. The negative electrode current collector foil 20b1 is a rectangular-shaped sheet. An exposed portion 20b3 is defined along one side of the rectangular-shaped negative electrode current collector foil 20b1. The negative electrode active material layer 20b2 is provided on the negative electrode current collector foil 20b1 except for the exposed portion 20b3. In this embodiment, the negative electrode current collector foil 20b1 is a copper foil. The negative electrode active material layer 20b2 contains a negative electrode active material. In a lithium-ion secondary battery, the negative electrode active material is a material that absorbs lithium ions during charge and releases the absorbed lithium ions during discharge, such as graphite. Other than graphite, various materials have been proposed for use as the negative electrode active material, and the negative electrode active material is not limited to a particular material.

The thickness of the positive electrode current collector foil 20a1 and the negative electrode current collector foil 20b1 is, for example, about 8 μm to about 20 μm. In this embodiment, it is desirable that the total thickness of the positive electrode active material layers 20a2, coated on both surfaces of the positive electrode current collector foil 20a1, be set to, for example, about 20 μm to about 200 μm. Likewise, it is desirable that the total thickness of the negative electrode active material layers 20b2, coated on both surfaces of the negative electrode current collector foil 20b1, be set to, for example, about 20 μm to about 200 μm.

The positive electrode active material layers 20a2 and the negative electrode active material layers 20b2 are alternately stacked in a thickness direction with the separators 20c interposed therebetween. Herein, the width b1 of the negative electrode active material layer 20b2 is wider than the width a1 of the positive electrode active material layer 20a2, and the width c1 of the separator 20c is wider than the width b1 of the negative electrode active material layer 20b2. The positive electrode active material layer 20a2 is stacked so as to be covered by the negative electrode active material layer 20b2. Moreover, the positive electrode active material layer 20a2 and the negative electrode active material layer 20b2 are stacked so as to be covered by the separator 20c.

The exposed portions 20a3 of the plurality of positive electrode sheets 20a (that is, the parts in which the positive electrode active material layer 20a2 is not formed on the positive electrode current collector foil 20a1) protrude from one lateral side of the separators 20c. The exposed portions 20b3 of the plurality of negative electrode sheets 20b protrude from another side of the separators 20c that is opposite the exposed portions 20a3 of the plurality of positive electrode sheets 20a.

Figure 3:
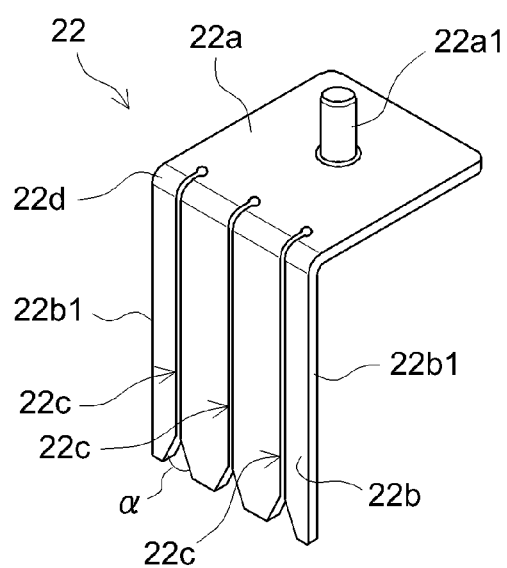
FIG. 3 is a perspective view illustrating a positive electrode current collector terminal 22.

The exposed portions 20a3 of the plurality of positive electrode sheets 20a, which protrude from the parts at which the positive electrode active material layers 20a2 and the negative electrode active material layers 20b2 are overlapped, are welded to the positive electrode current collector terminal 22. At the other end opposite to the exposed portions 20a3 of the plurality of positive electrode sheets 20a, the exposed portions 20b3 of the plurality of negative electrode sheets 20b are welded to the negative electrode current collector terminal 24. The positive electrode current collector terminal 22 and the negative electrode current collector terminal 24 have substantially the same structure. FIG. 3 is a perspective view illustrating the positive electrode current collector terminal 22.

As illustrated in FIG. 3, the positive electrode current collector terminal 22 includes a base plate portion 22a and a current collector plate portion 22b. In this embodiment, the base plate portion 22a is a flat-shaped part, and it is provided with a protuberance 22a1 extending outside of the lid 32 of the battery case 30. In this embodiment, the protuberance 22a1 is a part that is connected to an external terminal 23, which is to be attached to, for example, a terminal of a bus bar. The current collector plate portion 22b is curvedly continuous with the base plate portion 22a and extends along a direction orthogonal to the base plate portion 22a. In this embodiment, the current collector plate portion 22b is in a flat plate shape. The current collector plate portion 22b includes a plurality of slits 22c, each extending from a tip end of the current collector plate portion 22b along a direction orthogonal to the base plate portion 22a and each extending into a curved portion 22d provided between the base plate portion 22a and the current collector plate portion 22b. In the example shown in FIG. 3, the number of the slits 22c is 3. The number of the slits 22c is not limited to this embodiment, but it is desirable that two or more slits 22c be provided. Herein, the base plate portion 22a of the positive electrode current collector terminal 22 is referred to as a "first base plate portion" when appropriate. The current collector plate portion 22b of the positive electrode current collector terminal 22 is referred to as a "first current collector plate portion" when appropriate.

In a tip end portion of the current collector plate portion 22b, each of the plurality of slits 22c has a width (i.e., gap) widening toward the tip end of the current collector plate portion 22b. In this embodiment, the tip end portion of each of the slits 22c gradually widens. For example, it is desirable that, in the tip end portion of the current collector plate portion 22b, opposing side edges of the slit 22c widen at an angle α in the range of from about 45 degrees to about 70 degrees.

In this embodiment, a portion between the base plate portion 22a and the current collector plate portion 22b is bent curvedly. The plurality of slits 22c extend continuously to the curved portion 22d between the base plate portion 22a and the current collector plate portion 22b. In this embodiment, each of the plurality of slits 22c further extends into the base plate portion 22a.

In this secondary battery 10, as illustrated in FIG. 1, the exposed portions 20a3 of the positive electrode sheets 20a are gathered into three bundles, which are respectively fitted into the slits 22c formed in the current collector plate portion 22b of the positive electrode current collector terminal 22. Specifically, at one lateral side of the electrode assembly 20, in which the positive electrode sheets 20a and the negative electrode sheets 20b are stacked, the tip end of the current collector plate portion 22b of the positive electrode current collector terminal 22 is brought to the exposed portions 20a3 of the positive electrode sheets 20a, which protrude from the separators 20c, from above. Then, the exposed portions 20a3 of the positive electrode sheets 20a are bundled and inserted respectively into a plurality (three in this embodiment) of slits 22c, which are formed in the current collector plate portion 22b, in such a manner that the bundled exposed portions 20a3 are inserted respectively into the slits 22c along the flared portion of each of the slits 22c.

It is desirable that guide sheets be interposed at appropriate positions when stacking the positive electrode sheets 20a so that the exposed portions 20a3 can be smoothly bundled correspondingly to the plurality of slits 22c formed in the current collector plate portion 22b. It is desirable that a predetermined number of the exposed portions 20a3 should be bundled and guided by the guide sheets into each of the slits 22c and the bundled exposed portions 20a3 should be inserted into the slits 22c. As illustrated in FIG. 1, the sheets used for guiding the exposed portions 20a3 should be removed after the exposed portions 20a3 are fitted into the slits 22c. Alternatively, it is possible that, before guiding the slits 22c of the positive electrode current collector terminal 22 toward the exposed portions 20a3, the exposed portions 20a3 be gathered into appropriate bundles and retained by, for example, a gripping hand or the like that is provided for the manufacturing facility.

Next, as illustrated in FIG. 1, after the exposed portions 20a3 are fitted into the slits 22c, two opposite side edges 22b1 of the current collector plate portion 22b are clamped and pressed together to clamp the exposed portions 20a3 fitted into the slits 22c. This eliminates gaps between the slits 22c and the exposed portions 20a3. Under this condition, laser light L is applied to the slits 22c and the exposed portions 20a3 interposed between the slits 22c to laser weld the current collector plate portion 22b and the exposed portions 20a3 of the positive electrode sheets 20a to each other. Thus, the positive electrode sheets 20a and the positive electrode current collector terminal 22 are welded together.

The negative electrode current collector terminal 24 has a similar structure to the positive electrode current collector terminal 22, and it includes a base plate portion 24a and a current collector plate portion 24b. The current collector plate portion 24b is continuous with the base plate portion 24a and extends along a direction orthogonal to the base plate portion 24a. In this embodiment, the base plate portion 24a is provided with a protuberance 24a1 extending outside of the battery case 30. The protuberance 24a1 is a part that is to be connected to the external terminal 25.

In this embodiment, the current collector plate portion 24b is in a flat plate shape. Although not shown in the drawings, the current collector plate portion 24b includes a plurality of slits 24c, each extending from a tip end of the current collector plate portion 24b along a direction orthogonal to the base plate portion 24a, and each extending into a curved portion 24d provided between the base plate portion 24a and the current collector plate portion 24b. The exposed portions 20b3 of the negative electrode sheets 20b are bundled and fitted into the slits 24c, which are formed in the current collector plate portion 24b. The exposed portions 20b3 are clamped between the slits 24c and laser-welded, so as to be connected to the negative electrode current collector terminal 24. Thus, the negative electrode sheets 20b and the negative electrode current collector terminal 24 are welded together. Herein, the base plate portion 24a of the negative electrode current collector terminal 24 is referred to as a "second base plate portion" when appropriate. The current collector plate portion 24b of the negative electrode current collector terminal 24 is referred to as a "second current collector plate portion" when appropriate.

Here, the current collector terminals 22 and 24 may be formed in the following manner. For example, a plate material made of a metal is punched out into a predetermined shape corresponding to the base plate portions 22a and 24a and the current collector plate portions 22b and 24b, then slits corresponding to the plurality of slits 22c and 24c are formed therein, and thereafter, the punched-out materials are bent to form the current collector terminals 22 and 24. Each of the positive electrode current collector terminal 22 and the negative electrode current collector terminal 24 should be made of a material that can withstand a predetermined potential during the battery reactions. It is desirable that the positive electrode current collector terminal 22 be made of, for example, aluminum or an aluminum alloy. It is desirable that the negative electrode current collector terminal 24 be made of, for example, copper or a copper alloy.

The current collector plate portion 22b of the positive electrode current collector terminal 22 extends along a plane orthogonal to the exposed portions 20a3 of the plurality of positive electrode sheets 20a. The base plate portion 22a is curvedly continuous with the current collector plate portion 22b and extends along one side of the electrode assembly 20 that is orthogonal to one side thereof from which the exposed portions 20a3 of the positive electrode sheets 20a protrude. The current collector plate portion 22b includes a plurality of slits 22c, each extending from a tip end of the current collector plate portion 22b along a direction orthogonal to the base plate portion 22a and each extending into a curved portion 22d provided between the base plate portion 22a and the current collector plate portion 22b. The exposed portions 20a3 of the plurality of positive electrode sheets 20a are inserted in the slits 22c of the positive electrode current collector terminal 22.

Likewise, the current collector plate portion 24b of the negative electrode current collector terminal 24 extends along a plane orthogonal to the exposed portions 20b3 of the plurality of negative electrode sheets 20b. The base plate portion 24a is curvedly continuous with the current collector plate portion 24b and extends along one side of the electrode assembly 20 that is orthogonal to one side thereof from which the exposed portions 20b3 of the negative electrode sheets 20b protrude. The current collector plate portion 24b includes a plurality of slits 24c, each formed from a tip end of the current collector plate portion 24b along a direction orthogonal to the base plate portion 24a, and each extending into a curved portion 24d provided between the base plate portion 24a and the current collector plate portion 24b. The exposed portions 20a3 of the plurality of negative electrode sheets 20b are inserted in the slits 24c of the negative electrode current collector terminal 24.

Figure 4:
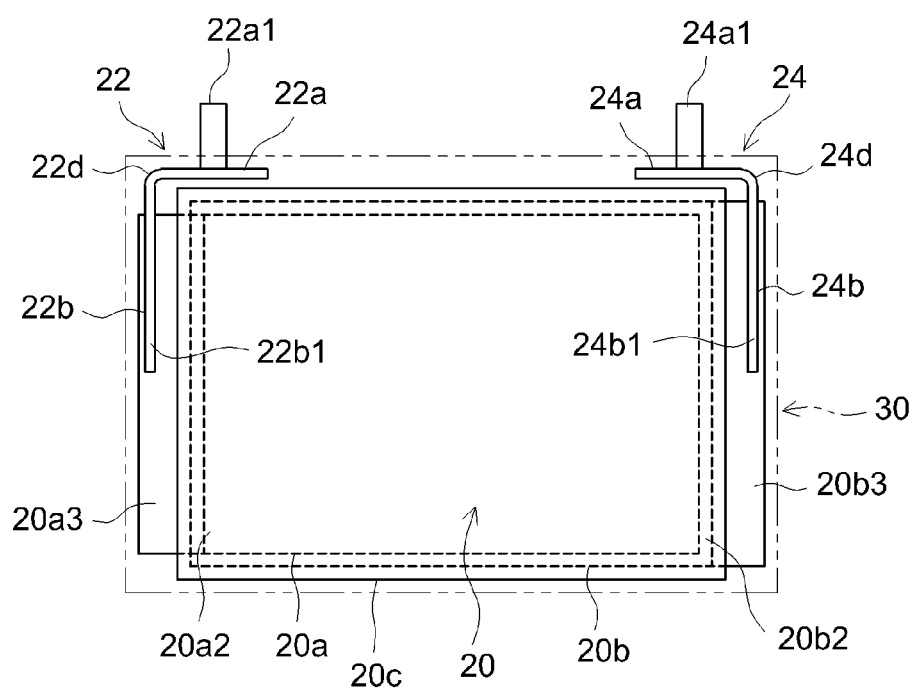
FIG. 4 is a front view illustrating the positive electrode current collector terminal 22 and a negative electrode current collector terminal 24 that are fitted to the electrode assembly 20.

FIG. 4 is a front view illustrating the positive electrode current collector terminal 22 and the negative electrode current collector terminal 24 that are fitted to the electrode assembly 20. In FIG. 4, the battery case 30 is indicated by dash-dot-dot lines. In the secondary battery 10, the positive electrode current collector terminal 22 and the negative electrode current collector terminal 24 include the base plate portions 22a and 24a and the current collector plate portions 22b and 24b, respectively, each of which is in a plate-shaped. The base plate portions 22a and 24a and the current collector plate portions 22b and 24b are arranged to form substantially a right angle at the curved portions 22d and 24d, and disposed along corner portions of the electrode assembly 20. This serves to reduce the space occupied by the positive electrode current collector terminal 22 and the negative electrode current collector terminal 24.

Thus, the electrode assembly 20, the positive electrode current collector terminal 22, and the negative electrode current collector terminal 24 are placed inside the battery case 30 along with a gasket, an insulating film, or the like. Because the positive electrode current collector terminal 22 and the negative electrode current collector terminal 24 can be arranged compactly in the battery case 30, it is possible to increase the size of the electrode assembly 20. In particular, the area in which the positive electrode active material layers 20a2 and the negative electrode active material layers 20b2 overlap is allowed to be larger. In other words, it is possible to ensure a large effective area of the positive electrode active material layer 20a2 and the negative electrode active material layer 20b2, which contributes to the battery reaction. This enables the secondary battery to have a higher battery capacity, with the volume of the secondary battery being equal. In other words, it is possible to provide a secondary battery with a higher capacity and a higher energy density.

In this embodiment, in each of tip end portions of the current collector plate portions 22b and 24b, each of the plurality of slits 22c and 24c, which are respectively formed in the current collector plate portions 22b and 24b of the positive electrode current collector terminal 22 and the negative electrode current collector terminal 24, has a width widening toward the tip end of each of the current collector plate portions 22b and 24b. As described above, the positive electrode current collector terminal 22 and the negative electrode current collector terminal 24 configured in such a manner allow the exposed portions 20a3 of the positive electrode sheets 20a and the exposed portions 20b3 of the negative electrode sheets 20b to be inserted respectively into the slits 22c and 24c by bringing the current collector plate portions 22b and 24b close to the exposed portions 20a3 and the exposed portions 20b3 from the upper end of the electrode assembly 20. Here, the upper end of the electrode assembly 20 is, in other words, an end of the electrode assembly 20 on which the base plate portions 22a and 24a are arranged so as to face the electrode assembly 20.

The exposed portions 20a3 of the positive electrode sheets 20a and the exposed portions 20b3 of the negative electrode sheets 20b are bundles of thin sheets, so they are likely to bend easily when pressed in a longitudinal direction of the sheets (i.e., in the direction in which they protrude from the separators 20c). However, the exposed portions 20a3 of the positive electrode sheets 20a and the exposed portions 20b3 of the negative electrode sheets 20b are inserted into the slits of the positive electrode current collector terminal 22 and the negative electrode current collector terminal 24 from the edges on the side orthogonal to the longitudinal direction of the sheets. For this reason, the exposed portions 20a3 of the positive electrode sheets 20a and the exposed portions 20b3 of the negative electrode sheets 20b are unlikely to bend when inserted into the slits of the positive electrode current collector terminal 22 and the negative electrode current collector terminal 24. Moreover, in this embodiment, in the tip end portion of each of the current collector plate portions 22b and 24b, each of the slits 22c and 24c has a width widening toward the tip end of each of the current collector plate portions 22b and 24b. Therefore, handling is easy when inserting the exposed portions 20a3 of the positive electrode sheets 20a and the exposed portions 20b3 of the negative electrode sheets 20b into the slits 22c and 24c.

In this embodiment, each of the current collector plate portions 22b and 24b is in a flat plate shape. Accordingly, the slits 22c and 24c are provided linearly along the direction in which exposed portions 20a3 of the positive electrode sheets 20a and the exposed portions 20b3 of the negative electrode sheets 20b are inserted, so the exposed portions 20a3 of the positive electrode sheets 20a and the exposed portions 20b3 of the negative electrode sheets 20b can easily be inserted into the slits 22c and 24c.

In this embodiment, in the positive electrode current collector terminal 22 and the negative electrode current collector terminal 24, the base plate portions 22a and 24a are curvedly continuous with the current collector plate portions 22b and 24b, respectively. The plurality of slits 22c and 24c formed in the current collector plate portions 22b and 24b respectively extend into the curved portions 22d and 24d provided between the base plate portions 22a and 24a and the current collector plate portions 22b and 24b. As described above, the exposed portions 20a3 of the positive electrode sheets 20a and the exposed portions 20b3 of the negative electrode sheets 20b are inserted respectively into the plurality of slits 22c and 24c, which are formed in the current collector plate portions 22b and 24b. Thereafter, the two opposite side edges 22b1 and 24b1 of the current collector plate portions 22b and 24b are clamped and pressed to clamp the exposed portions 20a3 and 20b3 fitted in the slits 22c and 24c by the opposing side edges of the slits 22c and 24c, respectively.

Because the plurality of slits 22c and 24c extend into the curved portions 22d and 24d, which are provided between the base plate portions 22a, 24a and the current collector plate portions 22b, 24b, the exposed portions 20a3 and 20b3 can be fitted deeply into the slits 22c and 24c. This allows the base plate portions 22a and 24a of the positive electrode current collector terminal 22 and the negative electrode current collector terminal 24 to be arranged close to the electrode assembly 20. As a result, the positive electrode current collector terminal 22 and the negative electrode current collector terminal 24 can be arranged compactly in the battery case 30, so the electrode assembly 20 can be made larger within the battery case 30. In particular, the area in which the positive electrode active material layers 20a2 and the negative electrode active material layers 20b2 overlap is allowed to be larger. As a result, with the volume of the secondary battery being equal, the battery capacity and the energy density can be made higher.

Moreover, in this embodiment, the plurality of slits 22c and 24c of the current collector plate portions 22b and 24b extend into the base plate portion 22a and 24a, respectively (see FIG. 3). This means that less force is required to deform the current collector plate portions 22b and 24b. The gaps between the inner side surfaces of the slits 22c, 24c and the exposed portions 20a3, 20b3 can be made smaller. As a result, in laser welding, laser light is less likely to leak into the electrode assembly 20, so it is possible to carry out laser welding appropriately. This makes it possible to improve the welding quality between the positive electrode current collector terminal 22 and the exposed portions 20a3 of the positive electrode sheets 20a and the welding quality between the negative electrode current collector terminal 24 and the exposed portions 20b3 of the negative electrode sheets 20b.

As illustrated in FIG. 3, this embodiment illustrates an embodiment in which the plurality of slits 22c and 24c of the current collector plate portions 22b and 24b extend into the base plate portions 22a and 24a, respectively. The positive electrode current collector terminal 22 and the negative electrode current collector terminal 24 are not limited to such an embodiment. The positive electrode current collector terminal 22 and the negative electrode current collector terminal 24 respectively include the base plate portions 22a and 24a and the current collector plate portions 22b and 24b, each of which is in a plate shape. The base plate portions 22a and 24a and the current collector plate portions 22b and 24b are arranged to form an angular shape, and disposed so as to fit corner portions of the electrode assembly 20. In such an embodiment, it is desirable that the slits 22c and 24c be formed with a certain depth (i.e., width) in the current collector plate portions 22b and 24b, from the viewpoint of ensuring a large effective area of the positive electrode active material layer 20a2 and the negative electrode active material layer 20b2, which contributes to the battery reaction. This serves to increase the area in which the positive electrode active material layers 20a2 and the negative electrode active material layers 20b2 overlap in the battery case 30, and as a result, serves to increase the battery capacity. From this viewpoint, the slits 22c and 24c should extend into the curved portions 22d and 24d, for example, and they do not necessarily need to extend into the base plate portions 22a and 24a.

In this embodiment, the slits 22c and 24c may also extend into the base plate portions 22a and 24a, respectively (see FIG. 3). In this case, less force is required to deform the current collector plate portions 22b and 24b, so that the inner side surfaces of the slits 22c and 24c can be in intimate contact with the exposed portions 20a3 and 20b3. This makes it possible to improve the welding quality between the positive electrode current collector terminal 22 and the exposed portions 20a3 of the positive electrode sheets 20a and the welding quality between the negative electrode current collector terminal 24 and the exposed portions 20b3 of the negative electrode sheets 20b in laser welding. Moreover, it is possible to reduce the flexural deformation of the base plate portions 22a and 24a that occurs when deforming the current collector plate portions 22b and 24b. It should be noted that the welding of the positive electrode current collector terminal 22 with the exposed portions 20a3 of the positive electrode sheets 20a, as well as the welding of the negative electrode current collector terminal 24 with the exposed portions 20b3 of the negative electrode sheets 20b, does not need to be achieved by laser welding, but any appropriate welding technique may be employed.

Various embodiments of the secondary battery and the current collector terminal proposed herein have been described hereinabove. The embodiments of the secondary battery and the current collector terminal described herein do not limit the scope of the present invention, unless specifically stated otherwise.

What is claimed is:
1. A secondary battery comprising:
a plurality of positive electrode sheets;

a plurality of negative electrode sheets;
a positive electrode current collector terminal; and
a negative electrode current collector terminal,
each of the positive electrode sheets comprising:
a rectangular-shaped positive electrode current collector foil; and
a positive electrode active material layer provided on the positive electrode current collector foil except for an exposed portion defined along one side of the rectangular-shaped positive electrode current collector foil; and each of the negative electrode sheets comprising:
a rectangular-shaped negative electrode current collector foil; and
a negative electrode active material layer provided on the negative electrode current collector foil except for an exposed portion defined along one side of the rectangular-shaped negative electrode current collector foil, wherein:
the positive electrode active material layers and the negative electrode active material layers are alternately stacked on top of another in a thickness direction with separators interposed therebetween;
the exposed portions of the plurality of positive electrode sheets protrude from one lateral side of the separators; and
the exposed portions of the plurality of negative electrode sheets protrude from another side of the separators that is opposite the exposed portions of the plurality of positive electrode sheets; and
the positive electrode current collector terminal comprising:
a first current collector plate portion extending along a plane orthogonal to the exposed portions of the plurality of positive electrode sheets;
a first base plate portion being curvedly continuous with the first current collector plate portion and extending along one side of the plurality of positive electrode sheets that is orthogonal to another side thereof provided with the exposed portions; and
a plurality of slits, formed from a tip end of the first current collector plate portion along a direction orthogonal to the first base plate portion, and extending into a curved portion provided between the first base plate portion and the first current collector plate portion; and
the negative electrode current collector terminal comprising:
a second current collector plate portion extending along a direction orthogonal to the exposed portions of the plurality of negative electrode sheets; and
a second base plate portion being curvedly continuous with the second current collector plate portion and extending along one side of the plurality of negative electrode sheets that is orthogonal to another side thereof provided with the exposed portions; and
a plurality of slits, formed from a tip end of the second current collector plate portion along a direction orthogonal to the second base plate portion, and extending into a curved portion provided between the second base plate portion and the second current collector plate portion, wherein:
the exposed portions of the plurality of positive electrode sheets are inserted in the slits of the positive electrode current collector terminal; and
the exposed portions of the plurality of negative electrode sheets are inserted in the slits of the negative electrode current collector terminal.

2. The secondary battery according to claim 1, wherein:
the plurality of slits in the first current collector plate portion extend into the first base plate portion; and
the plurality of slits in the second current collector plate portion extend into the second base plate portion.

3. The secondary battery according to claim 1, wherein:
in a tip end portion of the first current collector plate portion, each of the plurality of slits in the first current collector plate portion has a width widening toward the tip end of the first current collector plate portion; and
in a tip end portion of the second current collector plate portion, each of the plurality of slits in the second current collector plate portion has a width widening toward the tip end of the second current collector plate portion.

4. The secondary battery according to claim 1, wherein the first current collector plate portion and the second current collector plate portion are in a flat plate shape.

5. A current collector terminal comprising:
a base plate portion;
a current collector plate portion being curvedly continuous with the base plate portion and extending along a direction orthogonal to the base plate portion; and
a plurality of slits, extending from a tip end of the current collector plate portion along a direction orthogonal to the base plate portion and extending into a curved portion provided between the base plate portion and the current collector plate portion.

6. The current collector terminal according to claim 5, wherein each of the plurality of slits extends into the base plate portion.

7. The current collector terminal according to claim 5, wherein, in a tip end portion of each of the current collector plate portions, each of the plurality of slits has a width widening toward the tip end.

8. The current collector terminal according to claim 5, wherein the current collector plate portion is in a flat plate shape.

* * * * *